United States Patent [19]

Kirschbaum

[11] Patent Number: 4,463,302

[45] Date of Patent: Jul. 31, 1984

[54] DUAL POWER, CONSTANT SPEED ELECTRIC MOTOR SYSTEM

[75] Inventor: Herbert S. Kirschbaum, Asheville, N.C.

[73] Assignee: Westinghouse Electric Corp., Pittsburgh, Pa.

[21] Appl. No.: 479,775

[22] Filed: Mar. 28, 1983

[51] Int. Cl.³ .............................................. H02P 3/20
[52] U.S. Cl. .................................. 318/754; 318/817; 318/751
[58] Field of Search ............... 318/816, 817, 772–775, 318/794, 795, 812–815, 754, 751, 752

[56] References Cited

U.S. PATENT DOCUMENTS

| | | | |
|---|---|---|---|
| 1,886,895 | 11/1932 | Myers | 318/794 |
| 2,280,971 | 4/1942 | Packer | 318/795 |
| 2,476,073 | 7/1949 | Trickey | 318/795 |
| 3,549,969 | 12/1970 | Yoshimura | 318/752 |

*Primary Examiner*—David Smith, Jr.
*Attorney, Agent, or Firm*—R. P. Lenart

[57] ABSTRACT

A dual capacity permanent split capacitor electric motor system is provided with a stator having main and auxiliary windings. The main stator winding includes two winding sections which are connected in parallel with each other and across a pair of line terminals while the auxiliary winding is connected in series with a capacitor to form a circuit branch which is connected between the line terminals for operation at a first output power level. Switching means are provided to reconnect the main stator winding sections in series with each other and in series with a second capacitor to form a circuit branch which is connected between the line terminals while the stator auxiliary winding is connected directly between the line terminals for operation at a second output power level. Automatic rotation reversal occurs when the motor switches from the first to the second output power level.

6 Claims, 6 Drawing Figures

DUAL POWER, CONSTANT SPEED ELECTRIC MOTOR SYSTEM

STATEMENT OF GOVERNMENT INTEREST

The United States Government has rights in this invention pursuant to Prime Contract No. W-7405-ENG-26 and Subcontract No. 86X-24712-C, awarded by the Department of Energy.

BACKGROUND OF THE INVENTION

This invention relates to electric motors and more particularly to single phase alternating current induction motors in which the main and auxiliary windings are interchanged to provide for efficient operation at two output power levels.

Certain electric motor applications require that the motor drives a load at various levels of shaft horsepower. For example, dual stroke compressors and gear change compressors which are used in heat pumps operate at variable capacity levels while being driven at essentially constant speed. A characteristic of these compressors is that when running at reduced capacity they require considerably less shaft horsepower than when operating at full capacity. The efficiency of a normally applied permanent split capacitor motor suffers significantly at the reduced load thereby hurting the system performance at reduced capacity. Since systems studies indicate that such a compressor used in a heat pump may operate at about 80% of its hours at reduced capacity, it is desirable to enhance the low capacity efficiency. The present invention provides a motor which operates at two output power levels with an efficiency which is greater than that found in conventional permanent split capacitor motors when operated at similar power levels.

SUMMARY OF THE INVENTION

An electric motor system constructed in accordance with this invention comprises: a pair of line terminals for connection to a power source; a first stator winding including two winding sections; a second stator winding connected in series with a first capacitor to form a first circuit branch; a second capacitor; means for connecting the two winding sections of the first stator winding in parallel between the line terminals and for connecting the first circuit branch between the line terminals for operation at a first power level; and means for connecting the two winding sections of the first stator winding in series with each other and in series with the second capacitor to form a second circuit branch which is connected between the line terminals while the second stator winding is also connected between the line terminals for operation at a second power level. The ratio of the number of turns in the first stator winding to the number of turns in the second stator winding is greater than one but less than two. In one embodiment, the second capacitor may be connected in parallel with the first capacitor during motor operation at the first output power level.

DESCRIPTION OF THE PREFERRED EMBODIMENTS

For the purposes of illustration, the present invention will be described in terms of an electric motor which is used to drive a dual stroke compressor. However, it should be understood that the motor can be used with any compressor configuration that results in reduced load on the motor with essentially no change in speed. A dual stroke compressor operating in the short stroke mode has a reduced volumetric flow for the same pressure ratio as it would have when operating in the long stroke mode. As a consequence, the compressor capacity is reduced and the shaft power required of the motor is also reduced.

Figure 1:
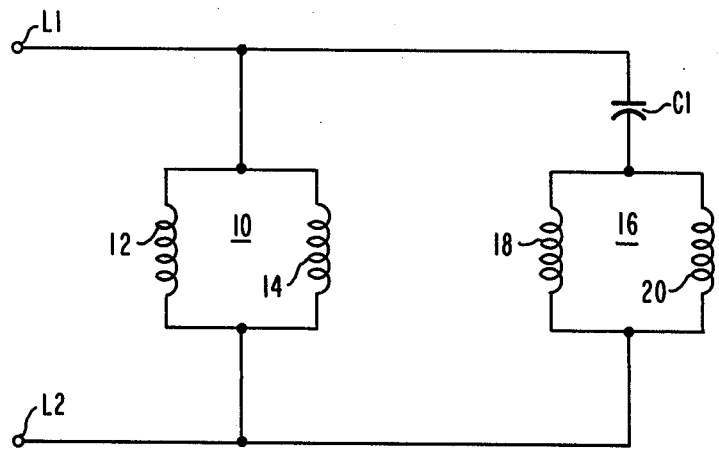
FIG. 1 is a schematic diagram of the stator circuit of a prior art permanent split capacitor motor.

FIG. 1 is a schematic diagram of the stator circuit of a prior art permanent split capacitor motor of the type which may be used to drive a dual stroke compressor. A pair of line terminals L1 and L2 are provided for connection to an external power source, not shown. A first or main stator winding 10 includes two winding sections 12 and 14 which are connected in parallel with each other and between line terminals L1 and L2. A second or auxiliary stator winding 16 includes the parallel connection of winding sections 18 and 20. Auxiliary winding 16 is connected in series with a capacitor C1 to form a first circuit branch which is connected between line terminals L1 and L2. A typical four horsepower compressor motor having a stator which is originally connected in accordance with FIG. 1 will be used to illustrate the preferred embodiment of the present invention. It should be noted that the four horsepower motor rating is merely used as a convenient designator, since the motor is capable of supplying eight to nine horsepower continuously in extreme air conditioning service. A study of a two stroke compressor as installed in a heat pump over a one year period in a typical application indicated that the heat pump operated approximately 80% of its total hours in the low capacity mode, and that while in this mode, the horsepower ranged from 1¾ to 3½. The high speed mode covered a range of from 5½ to nine horsepower and the compressor operated the remaining 20% of the time in this mode. The maximum efficiency of the example four horsepower motor occurs just outside the two ranges of compressor operation. In the low capacity mode, the efficiency is considerably less than the maximum potential value. The design characteristics of the example motor are as follows:

DESIGN DATA

Main Winding Effective Turns/pole = 108.20
Auxiliary Winding Effective Turns/pole = 174.53
Turns Ratio, a = 1.613
Stack Length = 4.25"
Punching = 6" Round
Main Winding Weight = 4.649 lbs. Cu.
Auxiliary Winding Weight = 2.021 lbs. Cu.
Capacitor, C1 = 40 µfd.
Capacitor Dissipation Factor = 0.005

Figure 2:
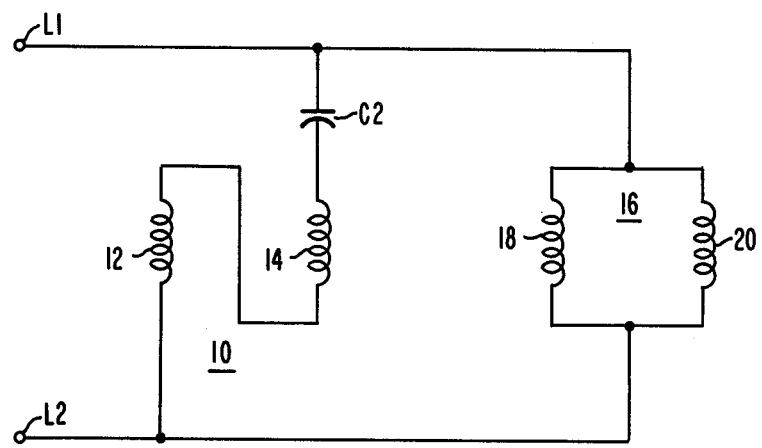
FIG. 2 is a schematic diagram of the stator circuit of the motor of FIG. 1 which has been reconnected in accordance with one embodiment of the present invention.

FIG. 2 is a schematic diagram of the stator circuit of the motor of FIG. 1 which has been reconnected in accordance with one embodiment of this invention for operation at a reduced power level. In this embodiment, former auxiliary winding 16 is connected directly between line terminals L1 and L2 and now acts as the main stator winding. The winding sections 12 and 14 of former main winding 10 have been reconnected to be in series with each other and in series with a capacitor C2 to form a second circuit branch which is connected between line terminals L1 and L2. With the windings connected in this manner, the volts per turn of winding 16 is now 65% of the volts per turn of winding 10 in the normal connection. In addition, the turns ratio is now (2×108.2/174.53) or 1.240. To a first approximation, the horsepower at maximum efficiency should be (0.62)² times the horsepower at maximum efficiency with the normal connection. When this calculation is made, the point of maximum efficiency should drop from 5.2 horsepower to 2 horsepower. In actuality, the point of maximum efficiency in the low power configuration occurs at about 1.7 horsepower instead of 2.0 horsepower. This discrepancy occurs because the reconnected machine has a different turns ratio and the balance point will occur at a different slip. The low power efficiency was calculated using a performance model which correlates well with the full strength performance.

Because of the normal sizing of capacitors, it is economically desirable to have a motor with a turns ratio greater than unity. For such a motor, let $a_H$ be the turns ratio for the high power configuration. Then for the low power configuration, with the two winding sections 10 and 12 connected in series, the turns ratio $a_L$ becomes:

$$a_L = (2/a_H)$$

Thus in order to have a turns ratio in the low power configuration in excess of unity, $a_H$ must lie below 2. It must be greater than unity, as mentioned above, for the high power configuration. However, the requirement of having a turns ratio between one and two is not an absolute necessity for the motor to work as described.

Figure 3:
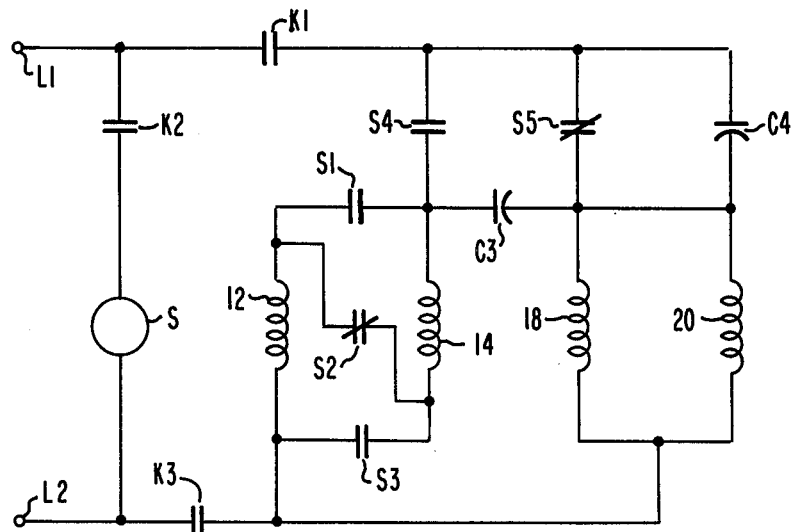
FIG. 3 is a schematic diagram of the stator circuit of a motor system in accordance with one embodiment of this invention.

FIG. 3 is a schematic diagram of the stator circuit of a dual power electric motor system constructed in accordance with one embodiment of the present invention. The contacts K1, K2, and K3 are controlled from a supervisory controller, not shown, at another location. K1 and K3 are main line contactors, while K2 controls relay coil S which in turn controls contacts S1 through S5. The circuit is shown in the lower power operating mode with contacts S2 and S5 in the closed state. In this operating mode, winding sections 18 and 20 are connected in parallel with each other and between terminals L1 and L2 and serve as the main winding. Winding sections 12 and 14 are connected in series with each other through contacts S2 and in series with capacitor C3 to form a circuit branch which is connected between line terminals L1 and L2. In this mode, winding sections 12 and 14 serve as the auxiliary winding and the value of capacitor C3 is selected in accordance with the resulting turns ratio. Since capacitor C4 is shorted by switch contacts S5, it plays no part in the motor's low power operating mode.

When contacts K2 are closed by the external supervisory controller, contacts S2 and S5 open, while contacts S1, S3, and S4 close. Under these conditions, winding sections 12 and 14 are placed in parallel with each other and directly across line terminals L1 and L2. This corresponds to operation with the normal main winding across the line. With switch contacts S5 open, capacitors C3 and C4 are in parallel with each other with the combination being in series with winding sections 18 and 20 which are connected in parallel with each other and serve their normal roll as the auxiliary winding of the machine.

It should be noted that when the circuit of FIG. 3 switches from the high power to the low power operating mode, the motor will reverse direction of rotation. This is a desirable feature, since rotation reversal can be used to activate a compressor unloading mechanism. The total capacitance (C3+C4) is equal to the capacitance of capacitor C1 in FIG. 1. For the example motor, C3 is approximately 10 to 15 μfd and C4 is approximately 25 to 30 mfd. Current capacitor price structures indicate that the two separate capacitors will cost less than a single large capacitor. To obtain reverse rotation of the motor of FIG. 1, four relay poles are required. The embodiment of the present invention shown in FIG. 3 requires five relay poles.

Figure 4:
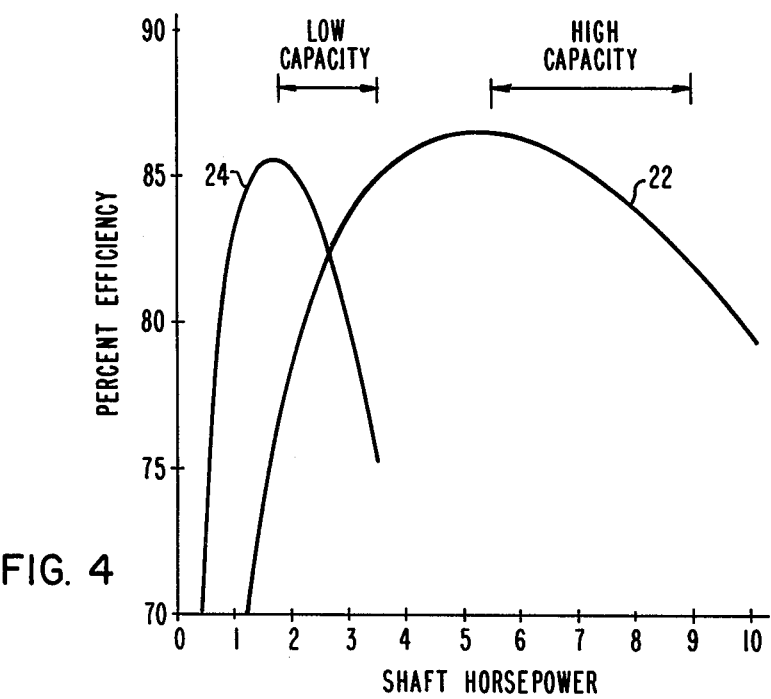
FIGS. 4, 5, and 6 are graphs showing the efficiency versus shaft horsepower for various motors having stator circuits in accordance with FIG. 3.

FIG. 4 is a graph of the efficiency versus shaft horsepower for the example motor having a stator connected in accordance with the circuit of FIG. 3. Curve 22 represents the efficiency with switch contacts S1, S3, and S4 closed. This is equivalent to a stator connection in accordance with FIG. 1. Curve 24 represents the efficiency in the low power mode with switch contacts S2 and S5 closed in FIG. 3. The peak efficiency in the low power mode is lower than in the high power mode. This results from the fact that the normal auxiliary winding of the example motor has only 43.5% as much copper as the normal main winding. When their roles are reversed, what now becomes the main winding has a resistance which is too high to serve that function well. Performance graphs for potentially more efficient motor designs are shown in FIGS. 5 and 6.

Figure 5:
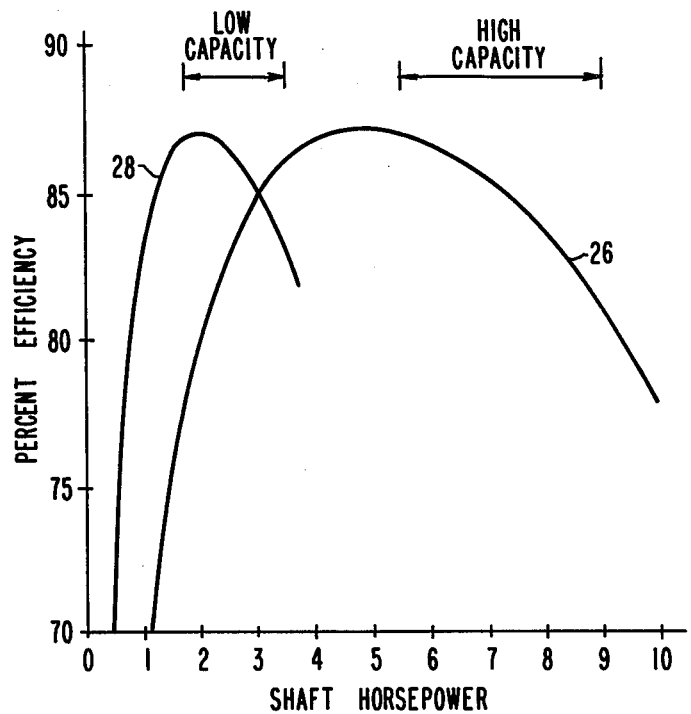

FIG. 5 includes two curves 26 and 28 which represent the high and low power operating modes respectively for a motor which is similar to the example motor but having 1.28 lbs. of copper added to the windings, an equality of weight between main and auxiliary windings, and a normal turns ratio of 1.503. The turns ratio in the low power mode is thus 2/1.503 or 1.331. For this example, the peak efficiencies are essentially equal.

Figure 6:
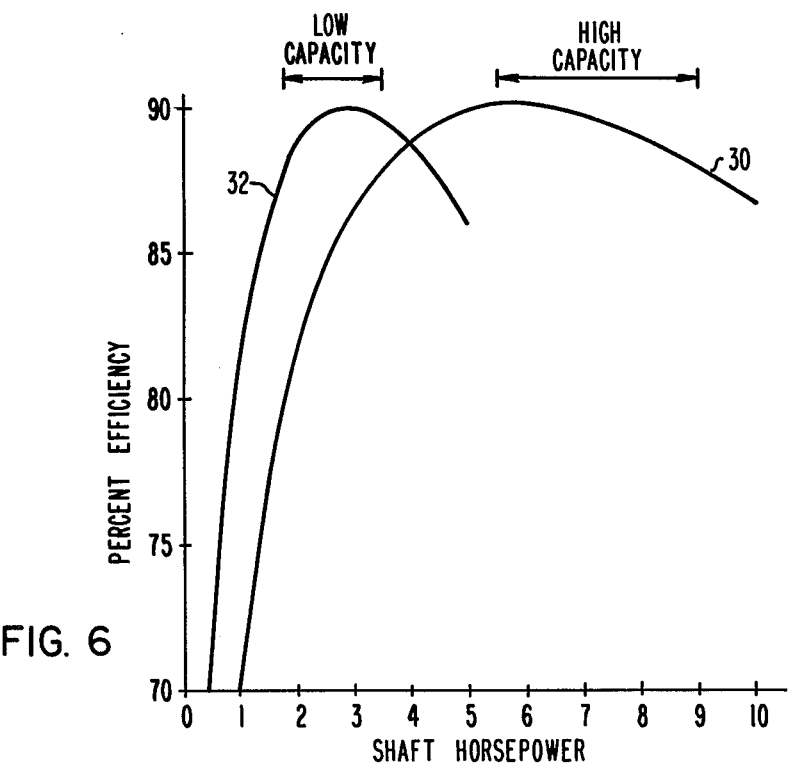

FIG. 6 shows the efficiency characteristics for a 4.85 inch stack motor wound on a 7 inch hexagonal uniform slot punching. In this case, equal weight windings were also used and the normal turns ratio was 1.505 with the low power operating mode turns ratio being 1.329. Curves 30 and 32 show that the peak efficiencies in both the high and low output power modes approach 90% and the high output power efficiency is generally larger than in the previous cases.

Although the present invention has been described in terms of what is believed to be the preferred embodiment, it will be apparent to those skilled in the art that various changes or modifications may be made without departing from the invention. It is therefore intended that the appended claims cover all such changes and modifications which may occur within the scope of the invention.

What is claimed is:

1. An electric motor system comprising:
   a pair of line terminals for connection to a power source;

a first stator winding including two winding sections;

means for connecting said two winding sections of said first stator winding in parallel with each other and between said line terminals for motor operation at a first output power level;

a second stator winding;

a first capacitor connected in series with said second stator winding to form a first circuit branch;

means for connecting said first circuit branch between said line terminals for motor operation at said first output power level;

means for connecting said second stator winding between said line terminals for motor operation at a second output power level;

a second capacitor;

means for connecting said two winding sections of said first stator winding in series with each other and in series with said second capacitor to form a second circuit branch; and means for connecting said second circuit branch between said line terminals for motor operation at said second output power level, wherein said first and second output power levels occur at substantially the same motor speed.

2. An electric motor system as recited in claim 1, wherein the ratio of the number of turns in said first stator winding to the number of turns in said second stator winding is greater than one but less than two.

3. An electric motor system as recited in claim 1, wherein said first and second stator windings comprise: copper conductors of substantially equal weights.

4. An electric motor system as recited in claim 1, wherein the ratio of the number of turns in said first stator winding to the number of turns in said second stator winding is approximately 1.33.

5. An electric motor system as recited in claim 1, further comprising:

means for connecting said second capacitor in parallel with said first capacitor for motor operation at said first output power level.

6. An electric motor system as recited in claim 1, wherein the direction of rotation of the motor, when operated at said first output power level, is opposite to the direction of rotation of the motor, when operated at said second output power level.

* * * * *